US008218575B2

(12) United States Patent
Li et al.

(10) Patent No.: US 8,218,575 B2
(45) Date of Patent: Jul. 10, 2012

(54) METHOD AND SYSTEM FOR SHORTENING THE LENGTH OF TIME GAPS BETWEEN DATA UNITS IN A DATA SWITCHING NETWORK

(75) Inventors: Chun-Yin Li, Hong Kong (HK); Alexander Ping-Kong Wai, Hong Kong (HK); Victor On-Kwok Li, Hong Kong (HK)

(73) Assignee: Versitech Limited, Hong Kong (HK)

( * ) Notice: Subject to any disclaimer, the term of this patent is extended or adjusted under 35 U.S.C. 154(b) by 20 days.

(21) Appl. No.: 12/277,028

(22) Filed: Nov. 24, 2008

(65) Prior Publication Data

US 2009/0135853 A1    May 28, 2009

(51) Int. Cl.
*H04J 3/24* (2006.01)
(52) U.S. Cl. .......................................... 370/474; 398/45
(58) Field of Classification Search .................. None
See application file for complete search history.

(56) References Cited

U.S. PATENT DOCUMENTS

| 2003/0021257 A1* | 1/2003 | Sato et al. ..................... 370/347 |
| 2003/0139168 A1* | 7/2003 | Sorrells et al. ................ 455/333 |
| 2008/0072035 A1* | 3/2008 | Johnson et al. ............... 713/153 |
| 2009/0135853 A1* | 5/2009 | Li et al. ......................... 370/474 |
| 2009/0190466 A1* | 7/2009 | Girardi et al. ................. 370/216 |

* cited by examiner

*Primary Examiner* — Jianye Wu
(74) *Attorney, Agent, or Firm* — Muncy, Geissler, Olds & Lowe, PLLC

(57) ABSTRACT

A method for shortening the length of time gaps between data units in a data switching network; the method comprising: arranging a group of K data units received consecutively at an input of a first device in K time units, where K is a positive integer; sending the arranged K data units to the inputs of M devices, where M is a positive integer; transferring a group of $H_j$ data units of the arranged K data units by a device j of the M devices from its inputs to its outputs within a time unit $T_x$ in the K unit time period, where $H_j$ is a positive integer and the sum of $H_j$ for j=1, ... M is equal to K, where $H_j \leq K$; arranging the data units sent to the devices of the M devices transferring at time unit $T_x$ such that no two inputs of the devices of the M devices transferring at time unit $T_x$ receive the same data unit at any moment; and repeatedly combining and arranging the K data units from the outputs of the M devices by a second device such that the K data units appear at the output of the second device consecutively.

23 Claims, 7 Drawing Sheets

METHOD AND SYSTEM FOR SHORTENING THE LENGTH OF TIME GAPS BETWEEN DATA UNITS IN A DATA SWITCHING NETWORK

This nonprovisional application claims priority to U.S. Provisional Application No. 60/996,584, which was filed on Nov. 26, 2007, and is herein incorporated by reference.

BACKGROUND OF THE INVENTION

Devices and methods have throughout been developed for the efficient transfer of data messages from one distance to another. The exponential growth in the volume of data message transfer led to the development of switching, effectively allowing multiples of data messages to be delivered over common lines.

Innovation eventually led to optical networks, which are shown to be suitable for providing the required transmission bandwidth for the rapidly growing communication traffic of present day.

Switching technology has likewise progressed. Packet switching has been widely considered as a successful approach to efficiently deal with the problem of transporting bursty data traffic. In packet switched networks, data streams are broken up into small packets of data. These small packets are multiplexed together with packets from other data streams inside a network. The packets are exchanged inside the network based on their destinations. To facilitate switching, a packet header is added to the body, i.e. "payload", in each packet. The header carries address information, for example, the destination address or the address of the next node in the path. The intermediate nodes read the header and determine where to forward the packet based on the information contained in the header. At the destination, packets belonging to a particular stream are received and the data stream is put back together. The predominant example of a packet-switched network is the Internet, which uses the Internet Protocol (IP) to route packets from their source to their destination. Packet switching may be one of the most important data transportation methods for furthering optical networks.

One problem in implementing a packet switched optical network is the difficulty of guaranteeing high bandwidth utilization, i.e., packet exchange rate and link utilization, when the fiber transmission rate is high. In an optical network node, optical switches are the devices to exchange packets between inputs and outputs of the node. Occasionally, optical switches require reconfiguration for the packet exchange. Although fast all-optical switching technologies have been demonstrated recently, fast optical switches with a switch reconfiguration time in nanoseconds or picoseconds range are only available in smaller sizes, such as 2×2. Large optical switches with up to a thousand ports have been demonstrated using the micro-electro-mechanical systems (MEMS) technology but the required switch reconfiguration time is in milliseconds (Kim et al. "1100×1100 part MEMS-based optical crossconnect with 4-dB maximum loss", IEEE Photonics Technology Letters, Vol. 5, No. 11, PP. 1537-1539, 2003). Although a multi-stage approach has been commonly used to build large electrical switches from small switches, the rapid accumulation of optical loss through the stages and the high interconnection complexity make it impractical for optical switches.

In the packet transmissions, a guard time ($T_g$) between packets is required to prevent packets from interfering with each other. In existing packet switches, packet-by-packet switching approach is used. The $T_g$ must be larger than the reconfiguration time ($T_{sw}$) of the switches that exchange the packets, i.e., the $T_g$ between packets has to be sufficiently large to prevent packets from being accidentally discarded in the switch. Since no data transmission can be taken during the period of $T_g$, low transmission bandwidth utilization will be obtained if the $T_g$ is large. Owing to the lack of large, fast optical switches, some approaches such as optical burst switching (OBS) tend to assume very large data packets for reasonable transmission bandwidth utilization (Qiao et al. "Optical burst switching (OBS)—a new paradigm for an optical Internet", Journal of High Speed Networks, Vol. 8, pp 69-84, 1999.) Since one cannot lengthen the packets by too much, the switch reconfiguration time will become increasingly significant in determining the transmission bandwidth utilization, unless we can reduce the switch reconfiguration time in proportion to the increase in the fiber transmission rate, or relax the constraint imposed on the packet guard time $T_g$ by switching fabric reconfiguration time $T_{sw}$.

It is an object of the present invention to overcome the disadvantages and problems in the prior art.

SUMMARY

In a first preferred aspect, there is provided a method for shortening the length of time gaps between data units in a data switching network; the method comprising:

arranging a group of K data units received consecutively at an input of a first device in K time units, where K is a positive integer;

sending the arranged K data units to the inputs of M devices, where M is a positive integer;

transferring a group of $H_j$ data units of the arranged K data units by a device j of the M devices from its inputs to its outputs within a time unit $T_x$ in the K unit time period, where $H_j$ is a positive integer and the sum of $H_j$ for j=1, ... M is equal to K, where $H_j \leq K$;

arranging the data units sent to the devices of the M devices transferring at time unit $T_x$ such that no two inputs of the devices of the M devices transferring at time unit $T_x$ receive the same data unit at any moment; and repeatedly combining and arranging the K data units from the outputs of the M devices by a second device such that the K data units appear at the output of the second device consecutively.

The data switching network may be a slotted network.

Each data unit may be a sequence of data bits whose total transmission time is smaller than a unit of time.

The data unit may not contain any information of the path to the destination of the data unit.

The data unit may contains dummy bits that do not carry information, and a period of time without signal transmission is considered as a sequence of dummy bits.

The data switching network may be a packet switching network.

Each data unit may be a packet which contains header and payload, the header having information indicating the path to the destination of the packet.

The data switching network may be an optical network.

The first device may be an optical splitter or an optical switch, with K outputs connecting to the inputs of the M devices such that K data units are sent to the M devices for each K unit time period.

The method may further comprise adding an optical delay element before the first device such that the K data units are delayed before entering the first device.

The method may further comprise adding an optical delay element after the outputs of the first device and before the inputs of the M devices such that the K data units are delayed before entering the M devices.

The optical delay elements at the inputs of the devices of the M devices may be transferring data units within the same predefined time unit $T_x$ have different delay values such that no two inputs of the devices receive the same data unit at any time.

The second device may be an optical combiner or an optical switch with K inputs connecting to the outputs of the M devices such that the K data units are combined and sent via the output of the second device consecutively.

The method may further comprise adding optical delay elements at the outputs of the M devices such that the K data units are delayed before entering the inputs of the second device.

The delay elements at the outputs of the M devices may have different delay values such that the K data units from the outputs of the M devices appear consecutively at the output of the second device.

The method may further comprise connecting a pilot message channel to a third device to describe the K data units sent to the inputs of the M devices such that the M devices are configured by the third device before the arrival of the K packets.

The optical delay elements are variable and fixed delay value optical fiber delay lines.

The device j may be an optical switch with reconfiguration time not larger than K−1 time units.

K may be greater than one.

In a second aspect, there is provided a system for shortening the length of time gaps between data units in a data switching network; the system comprising:

a first device having an input receiving an arranged group of K data units consecutively in K time units, where K is a positive integer;

M devices having inputs to receive the arranged K data units, where M is a positive integer;

a device j of the M devices to transfer a group of $H_j$ data units of the arranged K data units from its inputs to its outputs within a time unit $T_x$ in the K unit time period, where $H_j$ is a positive integer and the sum of $H_j$ for $j=1, \ldots M$ is equal to K, where $H_j \leq K$;

wherein the data units sent to the devices of the M devices transferring at time unit $T_x$ are arranged such that no two inputs of the devices of the M devices transferring at time unit $T_x$ receive the same data unit at any moment; and repeatedly combining and arranging the K data units from the outputs of the M devices by a second device such that the K data units appear at the output of the second device consecutively.

Another aspect of the invention comprises a method for shortening the length of time gaps between data units in a data switching network. The method includes arranging a group of K data units received consecutively at an input of a first device in a time period of length L, where K is a positive integer and L is a positive real number, sending the arranged K data units to the inputs of M devices, where M is a positive integer, transferring a group of $H_j$ data units of the arranged K data units by a device j of the M devices from its inputs to its outputs within a time period $T_j$ of length $L_j$, where $H_j$ is a positive integer and the sum of $H_j$ for $j=1, \ldots M$ is equal to K, where $H_j \leq K$, and $L_j$ is a positive real number, where $L_j \leq L$ for $j=1, \ldots M$, arranging the data units sent to the devices of the M devices transferring at time period $T_j$ such that no two inputs of the devices of the M devices transferring at time period $T_j$ receive the same data unit at any moment for $j=1, \ldots M$, and repeatedly combining and arranging the K data units from the outputs of the M devices by a second device such that the K data units appear at the output of the second device consecutively.

The present invention relates to optical switches and architectures, and methods for their use, for the transmission of packets over a network. Through the invention, optical packet switches with very high utilization of transmission bandwidth are presented.

The invention first divides a packet stream into multiple packet sub-streams and then sends the packets of the sub-streams to the switching fabrics in the optical switches. After the division of the packet stream into packet sub-streams, time gaps with duration of multiple packet transmission time are generated between the packets in the same sub-streams. These time gaps can be used for the reconfiguration of the switching fabrics. Consequently, the reconfiguration time of the switching fabrics is only required to be smaller than the minimum of the time gaps of the packet sub-streams and is no longer necessary to be smaller than the packet guard time in the original packet stream. Since packets typically have length of kilobytes or more, we can use switching fabrics with reconfiguration time at least thousands times of that normally required for optical packet switching. After the packets have been transferred to the required outputs of the switching fabrics, we can have a single signal stream by merging the packets from the corresponding outputs of the switching fabrics.

BRIEF DESCRIPTION OF THE DRAWINGS

These and other features, aspects, and advantages of the apparatus and methods of the present invention will become better understood from the following description, appended claims, and accompanying drawings where:

DETAILED DESCRIPTION

The following description of certain exemplary embodiment(s) is merely exemplary in nature and is in no way intended to limit the invention, its application, or uses. Throughout this description, the term "signal" shall refer to a digital or analog indicator whether cohesive or non-cohesive, mechanical, electrical, or optical in nature, that possesses data. The term "optical splitter" shall refer to a device capable of splitting, duplicating, or copying an optical signal to result in two or more optical signals of equal or varying strength. The term "optical multiplexer" shall refer to a device capable of accepting multiple optical signals and combining them into one signal.

Figure 1:
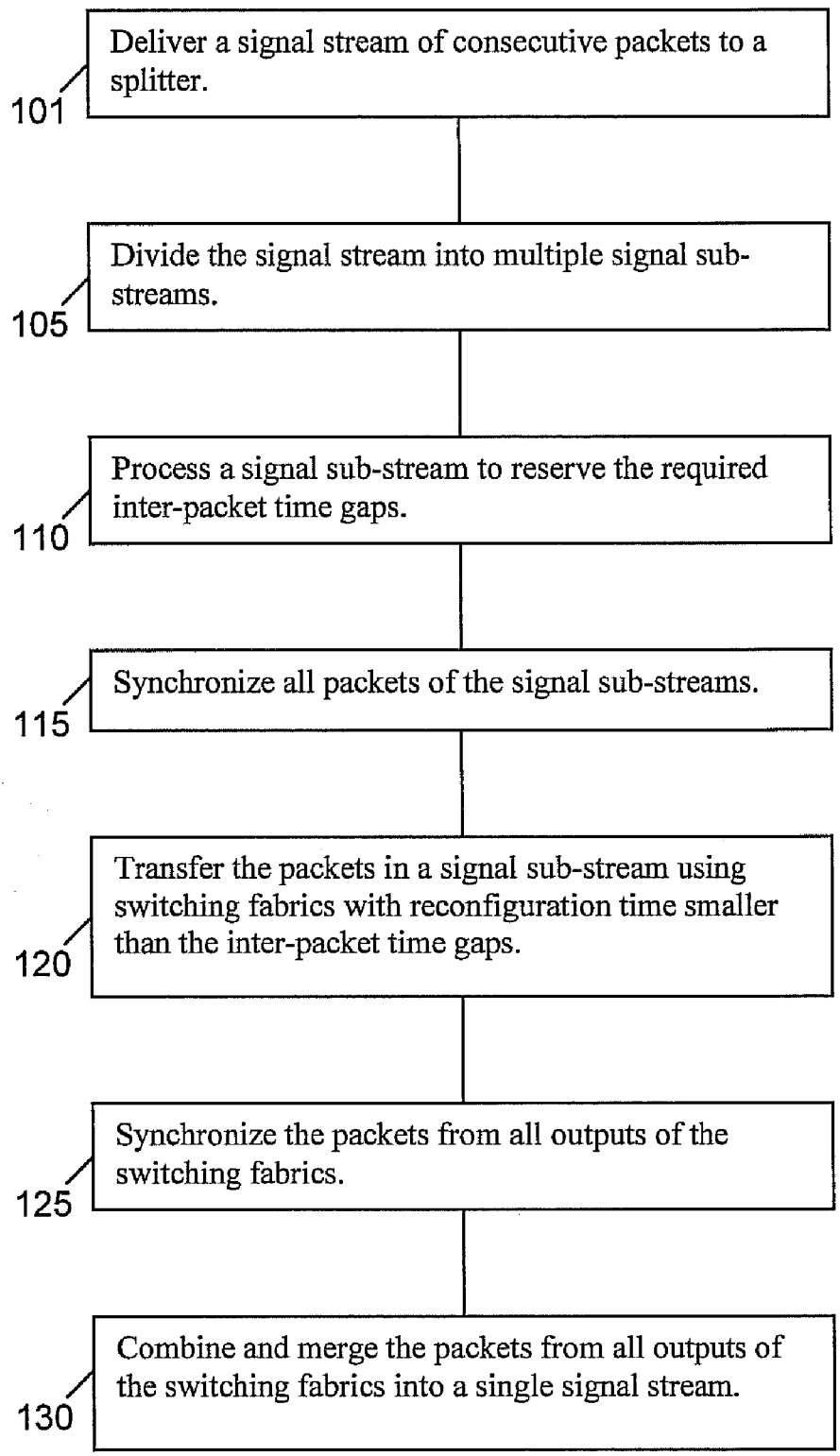
FIG. 1 shows a block diagram of the method of switching performed by the present switches.
Figure 3:
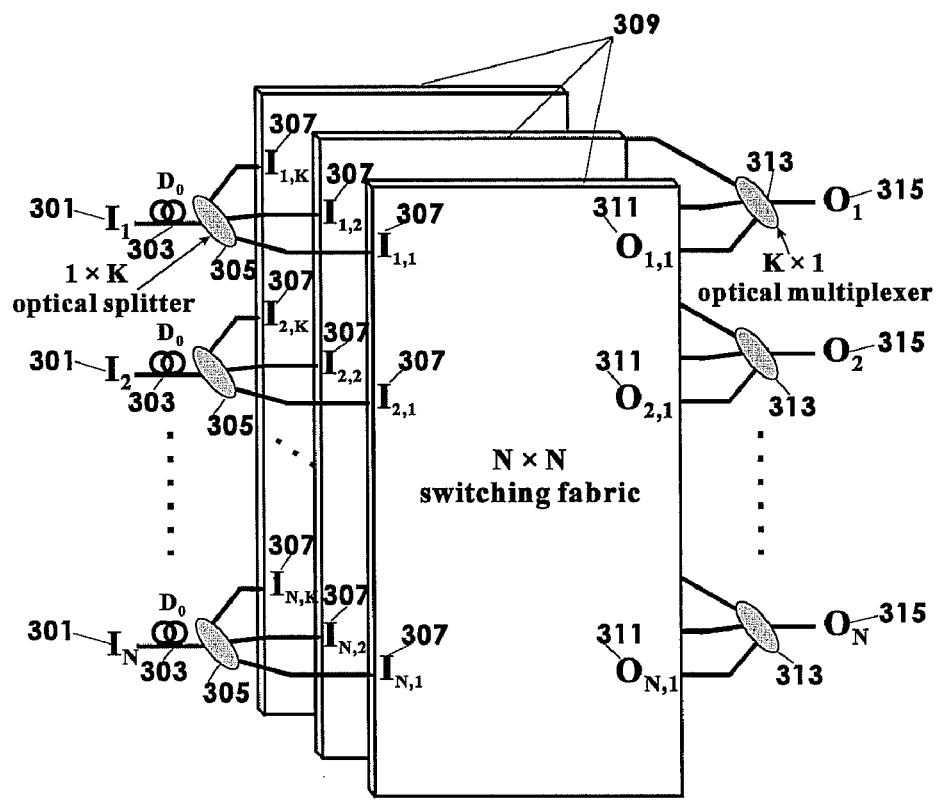
FIG. 3 shows an embodiment of the present switch wherein multiple switch fabrics are utilized.
Figure 4:
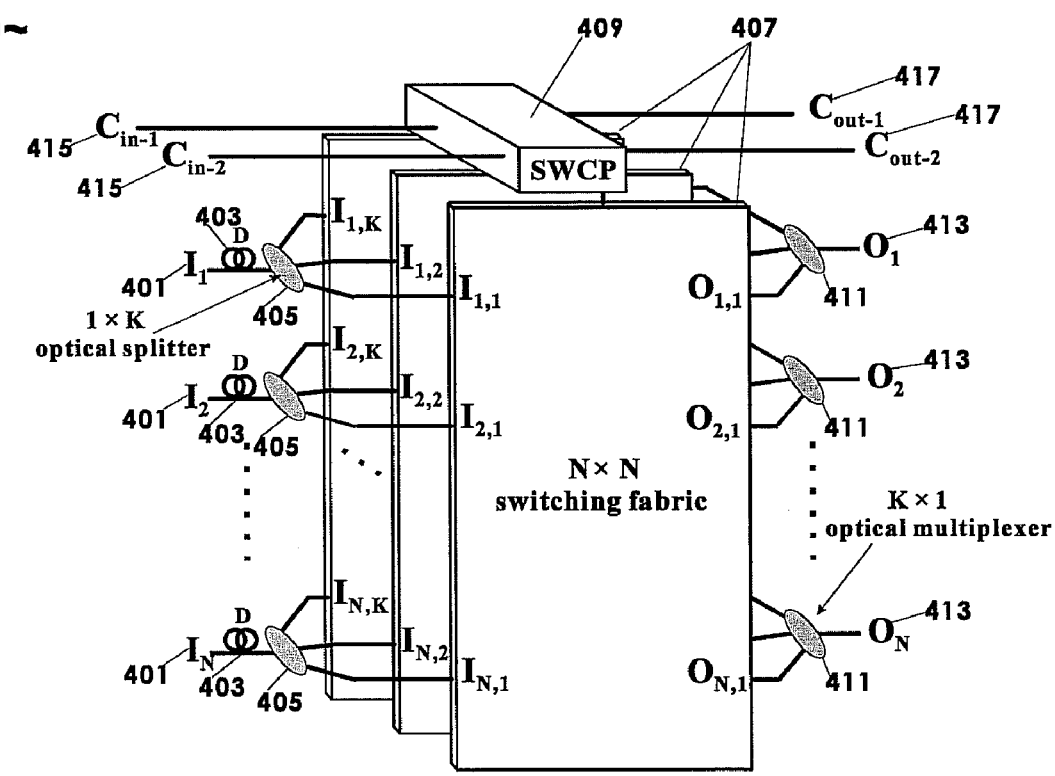
FIG. 4 shows another embodiment of the present switch, wherein the switch further includes a switching control processor.

FIG. 1 shows a block diagram of the general method of the invention for switching packets consecutively received from a signal stream. Examples of different implementation of the method are shown in FIGS. 2-4.

In 101 of FIG. 1, a signal stream is received, and is sent to a splitter. The splitter splits the power of the signal and duplicates multiple copies (sub-streams) of the signal stream at its outputs in 105. If K copies of the signal stream have been duplicated, in principle, we can fully recover the information of the original signal stream by only retrieving 1/K information of each duplicated signal stream. Hence, (K−1)/K of the time period of each duplicated signal stream will be available for the switch reconfiguration if we have properly arranged the packets in the duplicated signal streams. In 110, a period of time in a duplicated signal stream is reserved and is used as the time gap for the reconfiguration of the switching fabric which transfers the packets of the duplicated signal stream. A switching fabric is the module used in an switch that transfers the packets between the inputs and outputs of the switch. Apart from reserving the time gap, we also need to properly arrange (synchronize) the packets from different duplicated signal streams so that the switching fabrics can correctly transfer the packets. In 115 of FIG. 1, the packets of different duplicated signal streams are properly synchronized before being sent to the switching fabrics. When the packets of the duplicated signal streams arrive at the inputs of the switching fabrics connecting to the splitter, the switching fabrics have already completed the required reconfiguration because of the sufficiently large time gaps between the packets. In 120 of FIG. 1, the packets of the duplicated signal streams are therefore sent to the required outputs of the switching fabrics. Note that the reconfiguration time of the switching fabrics must be smaller than the time gaps between the packets of the duplicated signal streams. After the packets have been transferred to the required outputs of the switching fabrics, we have to combine and merge the packets from different outputs of the switching fabrics into a single signal stream. Hence, the packets are first synchronized in 125 of FIG. 1 and then combined and merged into a single signal stream in 130 of FIG. 1.

Figure 2:
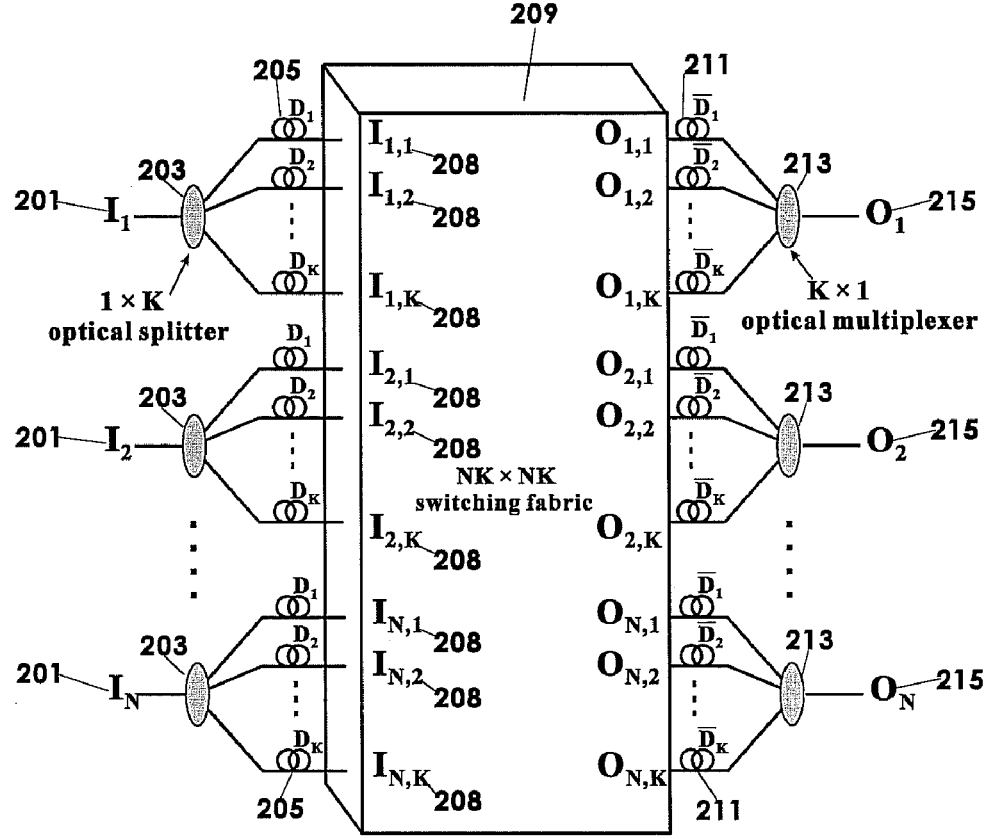
FIG. 2 shows an embodiment of an optical switch of the present invention.

FIG. 2 is an embodiment of an optical switch 200 of the present invention. This is an implementation of the general method shown in FIG. 1.

In the optical switch 200, input signals 201 are delivered to the switch 200 and output signals 215 are delivered therefrom. The number of input signals 201 can range from 1 to N, where N can be any positive number. An optical splitter 203 is utilized to duplicate the input signal 201 into "K" number of signals. As known in the art, this can be accomplished by tapering the input signal in a funnel type shape connecting the large input signal to smaller signals. An example of suitable optical splitters includes those taught in U.S. Pat. No. 7,266,277, incorporated herein by reference.

In this and other embodiments, "K" number of signals refers to the number of outputs delivered from the optical splitter to the switching fabric. "K" can be any number so long as the value is greater than the ratio of reconfiguration time and transmission time to packet guard time and transmission time.

Delay elements, such as fiber delay lines 205 can be employed in the switch. Suitable fiber delay lines include fiber collimators reflection elements, such as mirrors or prisms. Examples of fiber delay lines include commercial models from SANTEC Corp. of Hackensack, N.J. and General Photonics Corp. of Chino, Calif.

Other embodiments include fiber delay lines having a plurality of optical fibers, each having a unique predetermined optical length. Fiber delay lines taught in European Patent No. EP1099965, incorporated herein by references, are suitable.

The optical signals in the fiber delay lines 205 are delayed $D_k$, where k=1,2,3, ... K. The delayed input signals are to be sent to switching fabric 209 via inputs $I_{i,k}$ 208, where i=1, ... N and k=1,2,3, ... K. In one embodiment, the switching fabric 209 is non-blocking. As known in the art, the switching fabric 209 is non-blocking if any unused input port can be connected to any unused output port. The non-blocking switch is capable of realizing every interconnection pattern between the inputs and the outputs. Commercially available non-blocking optical switches, such as those of Glimmerglass® (Hayward, Calif.) are suitable for use herein. The switching fabric can be a NK×NK optical switch, where N is the number of input signals.

Signals are then passed through the delay lines 211, recombined via an optical multiplexer 213, and sent out through optical lines 215.

While not to be bound by theory, the optical splitter 203 and the fiber delay lines 205 convert the original packet stream into multiple packet sub-streams such that packets from the input signal 201 will appear sequentially on the inputs $I_{i,k}$ 208 to the switching fabric 209. Therefore, a new set of input packets is presented to the switching fabric 209 every K time slots. The switching fabric 209 is arranged to transfer a packet during rounds of K time slots, allowing at least K−1 time slots for reconfiguration.

FIG. 3 is another embodiment of the switch of the present invention, wherein "K" or more switching fabrics are utilized as opposed to the one switching fabric in switch 200. This is another implementation of the general method shown in FIG. 1.

In FIG. 3, input signals 301 are firstly delayed 303, and then passed to an optical splitter 305. The split signals are then passed to the inputs of switching fabrics $I_{i,k}$ 307 where i=1, ... N, k=1,2,3, ... K. The switching fabrics 309 are preferably non-blocking.

The optical signals from the switching fabric outputs $O_{i,k}$ 311 are recombined via an optical multiplexer 313, followed by passage to the optical lines 315, where i=1, ... N, k=1,2,3, ... K. Theoretically, while one switching fabric 309 is in reconfiguration, the other switching fabrics 309 freely transfer packets. Hence, the time of the packet transmissions at the other switching fabrics becomes the available time for a switching fabric configuration, if it is scheduled properly.

FIG. 4 is a further embodiment of a switch of the present invention, wherein the switch 400 further includes a switching control processor (SWCP) 409. This is also another implementation of the general method shown in FIG. 1.

As in FIG. 4, this embodiment exhibits "K" or more switching fabrics 407, fed by optical splitters 405. The switching fabrics 407 no longer read the packet address information from the input signals 401, rather the SWCP 409 takes over the packet output lookup operations and read the packet address information from the control channels 415. Once having completed the packet output lookup, the SWCP 409 sends pilot messages to control channel 417 to inform the subsequent nodes about the packets sent to outputs. Following combination by the optical multiplexer 411, the signals are sent to optical lines 413.

EXAMPLE 1

Figure 5:
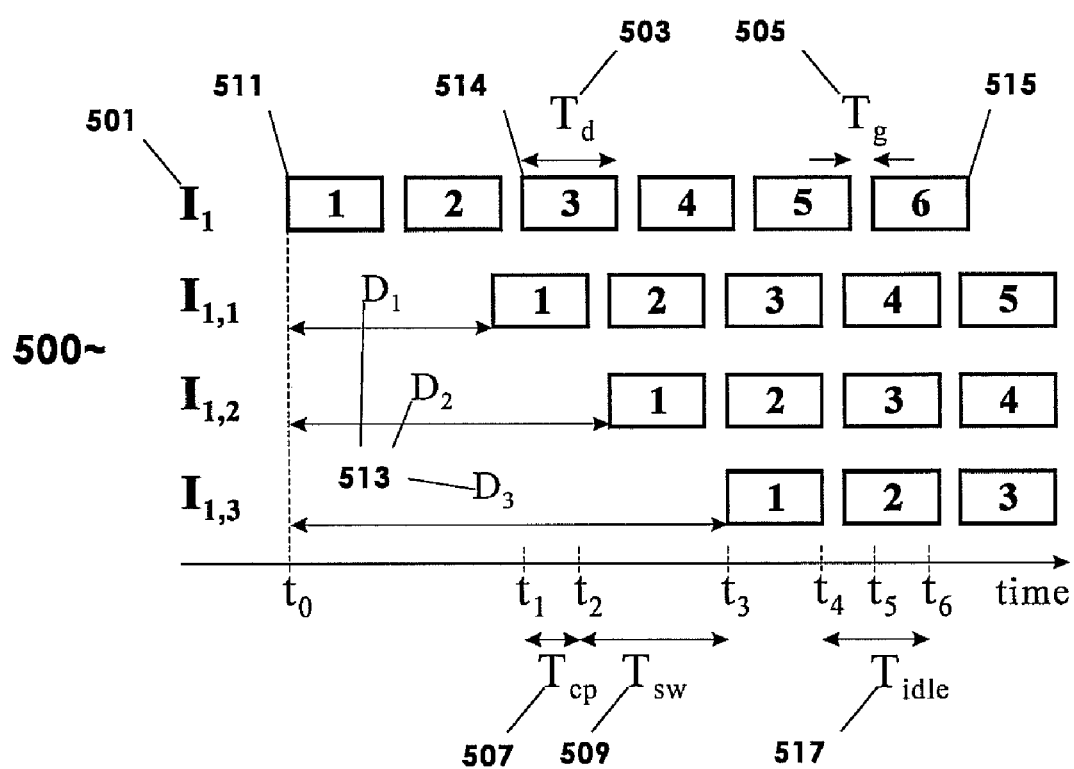
FIG. 5, with reference to Example 1, shows the transfer of packets through the present switch in FIG. 2.
Figure 6:
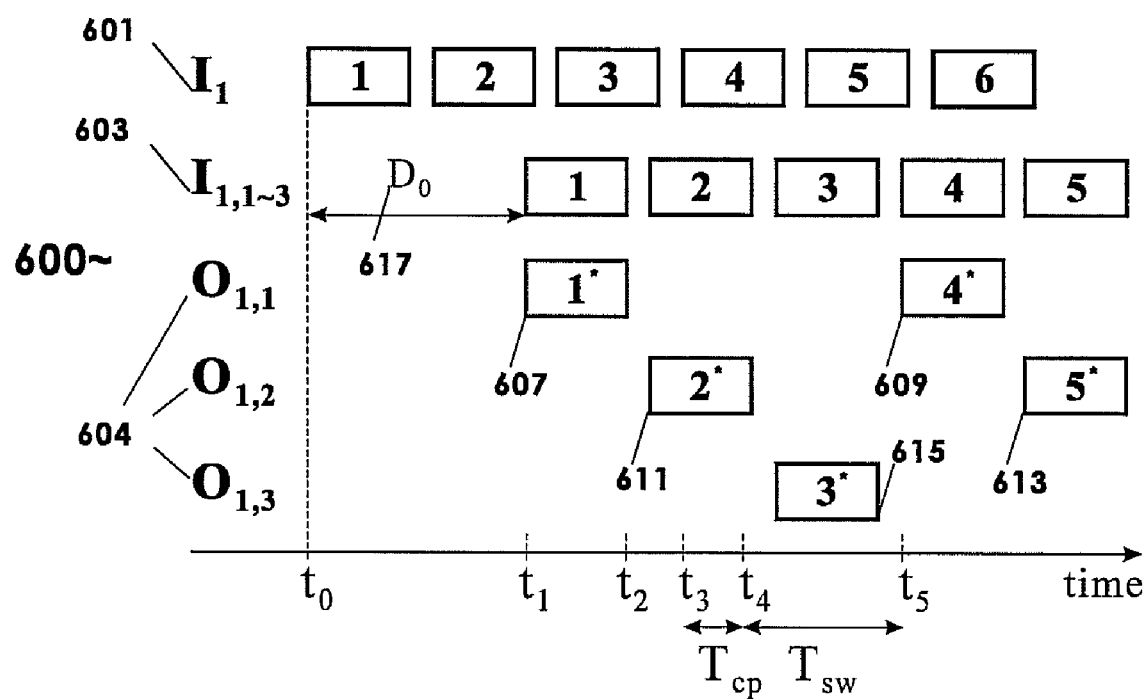
FIG. 6, with reference to Example 1, shows the transfer of packets through the present switch in FIG. 3.
Figure 7:
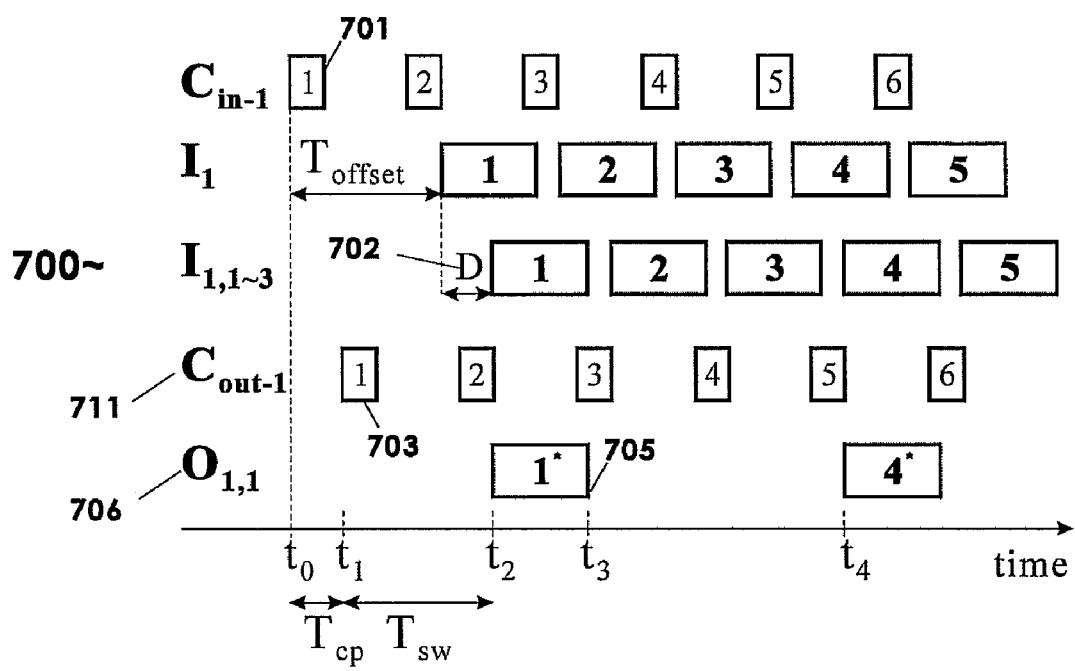
FIG. 7, with reference to Example 1, shows the transfer of packets through the present switch in FIG. 4.

FIGS. 5-7 show examples of the passage of packets through the present switches. In the examples, the "K" value is 3.

FIG. 5 shows the timing diagram for the packet transfer at the input link $I_1$ 501 of the switching fabric of a 2×2 optical switch 500 as exhibited in FIG. 2, with K=3, where $T_d$ 503 is a packet transmission time, $T_g$ 505 is the required guard time for preventing crosstalk between packets, $T_{cp}$ 507 is the required time for looking up the output of an incoming packet, and $T_{sw}$ 509 is the required reconfiguration time for the switching fabric. A slot time $T_{slot}$ is equal to $T_d+T_g$. We assume that the output lookup operation only requires the information of the packet address and is independent of the switching fabric's status. The switching fabric can transfer packets between its inputs and outputs even if the switch is looking up the outputs for new input packets. However, no packet transfer at the switching fabric is possible during the switch reconfiguration duration $T_{sw}$. Hence, the switch can transfer 2K packets per each time period of $T_{sw}+T_d$ if we have properly arranged the packet transfer and output lookup operations. We assume that the switch immediately detects the packet address when a packet arrives at input link $I_1$.

Packet 1 511 arrives at the input link $I_1$ at time $t_0$ when the system is idle. Because of the finite switch reconfiguration time ($T_{cp}+T_{sw}$=1.7 time slots ($T_{slot}$)), the switch is not able to directly transfer packets from $I_1$. The incoming packets are delayed by $D_1$, $D_2$ and $D_3$ 513 when they are sent to the inputs $I_{1,1}$, $I_{1,2}$ and $I_{1,3}$ of the switch, respectively. After reading the address of packet 3 514 at time $t_1$, the switch starts to configure the switching fabric to prepare for packet transfer at time $t_2=t_0+D_3-T_{sw}$. The packets 1, 2, and 3 are finally transferred to the switch outputs in time duration $t_2$ to $t_3$ after the completion of the switching fabric internal path setup. It is observed that the switch can also start the switching fabric internal path configuration at time ($t_0+D_2-T_{sw}$) or ($t_0+D_1-T_{sw}$) instead with one or two empty output slots in the initial round of packet transfer. The average added packet delay, however, remains unchanged. The switch reads the packet 6 515 for the next round of the packet transfer process at time $t_5$ and starts the switching fabric reconfiguration at time $t_6$. The switching fabric is therefore idle for a period of $T_{idle}$ 517 between the two reconfigurations. $T_{idle}$ is smaller than a slot time $T_{slot}$ and should be minimized for transmission bandwidth efficiency.

FIG. 6 shows the time diagram for the packets at input link $I_1$ 601, at inputs $I_{1,1}$ to $I_{1,3}$ 603, and outputs $O_{1,1}$ to $O_{1,3}$ 604 of the switching fabrics of a 2×2 optical switch 600 as exhibited in FIG. 3, when K is 3. In FIG. 6, we assume that the total time required for packet output lookup and switching fabric reconfiguration is also equal to 1.7 time slots, i.e., $T_{cp}+T_{sw}$=1.7 $T_{slot}$. We also assume that all switching fabrics 309 detect the packet addresses at the input link $I_1$ 601. However, the switching fabrics 309 are scheduled to operate in sequence such that switch fabric k 309 only starts its packet output lookup and reconfiguration at packets 3Z+k, where Z is a non-negative integer and k=1, . . . , 3. For example, switching fabric 1 only takes care of the packets 1, 4, 7, . . . as shown in the FIG. 6. We assume that the packet transfer delay from the inputs to outputs of a switching fabric is negligible.

A packet 1* 607 (it may be a new packet, or a packet come from inputs $I_{1,1}$ or $I_{2,1}$) is sent out to output $O_{1,1}$ 604 during time period $t_1$ to $t_2$. The switching fabric 1 309 then waits until time $t_3$ and takes ($T_{cp}+T_{sw}$) time for the packet output lookup and internal path reconfiguration to transfer packet 4* 609 to output $O_{1,1}$ at time $t_5$. During the time period $t_2$ to $t_5$, switching fabrics 2 and 3 309 process the input packets 2 and 3 and transfer packets 2* 611 and 3* 615 to outputs $O_{1,2}$ and $O_{1,3}$ in sequence. Similarly, switching fabrics 3 and 1 309 will transfer packets 3* 615 and 4* 609 to outputs $O_{1,3}$ and $O_{1,1}$ 604 during the reconfiguration of switching fabric 2 309. As the switching fabrics 309 shift their operations in sequence, the switch 300 of FIG. 3 can non-interruptedly transfer packets between its inputs and outputs. Similar to that of the KN×KN switching fabric 209 of FIG. 1, each N×N switching fabric 309 of FIG. 3 needs to reconfigure itself per K packet transmission times.

FIG. 7 is the timing diagram for the packets at input link $I_1$, at inputs $I_{1,1}$ to $I_{1,3}$, outputs $O_{1,1}$ of the switching fabric, and the pilot messages at control channels $C_{in-1}$ and $C_{out-1}$ of the 2×2 optical switch 700 as exhibited in FIG. 4 when K is 3.

The pilot message 1 701 arrives at time $t_0$. The switching control processor (SWCP) 409 takes $T_{cp}$ time to lookup the output and therefore the switching fabric 407 starts the internal path reconfiguration at time $t_1$. To compensate the pilot message processing time at the SWCP, the fiber delay lines 403 at each input link $I_1$ has delay value of D 702 that is not smaller than $T_{cp}$. Although the time is at $t_1$, the SWCP processor already has the complete information of the whole switch in the coming $T_{offset}$ time, e.g., the packet 1* 705 will be sent to output $O_{1,1}$ 706 at time $t_2$. If packet 1* 705 is a new packet, it is assumed assume that it is delayed at least ($T_{cp}+T_{sw}$) time before its injection to the switch, i.e., packet 1* has to arrive at the switch before time to such that the SWCP processor will include it in the output assignment at $t_1$. Hence, the SWCP processor send out the pilot message 1* 703 to the control channel $C_{out-1}$ 711 at time $t_1$ without waiting for the completion of the switching fabric reconfiguration. With the assumption of using the same routing paths of their associated packets, pilot messages will arrive at the subsequent nodes $T_{offset}$ time ahead, and the subsequent nodes can pre-configure their switching fabrics accordingly.

Both switch architectures of FIGS. 2 and 3 need no pilot messages and it is feasible to use switching fabrics of different reconfiguration times in different nodes. In spite of the inflexibility in the sourcing of switching fabric, the switching approach of FIG. 4, can embed the pilot messages into the earlier arriving packets, e.g., pilot messages 3 and 4 can be carried in packets 1 and 2.

Having described embodiments of the present system with reference to the accompanying drawings, it is to be understood that the present system is not limited to the precise embodiments, and that various changes and modifications may be effected therein by one having ordinary skill in the art without departing from the scope or spirit as defined in the appended claims.

In interpreting the appended claims, it should be understood that:

a) the word "comprising" does not exclude the presence of other elements or acts than those listed in the given claim;

b) the word "a" or "an" preceding an element does not exclude the presence of a plurality of such elements;

c) any reference signs in the claims do not limit their scope;

d) any of the disclosed devices or portions thereof may be combined together or separated into further portions unless specifically stated otherwise; and e) no specific sequence of acts or steps is intended to be required unless specifically indicated.

We claim:

1. A method for shortening the length of time gaps between data units in a data switching network; the method comprising:

arranging a group of K data units received consecutively at an input of a first device in a time period of K units, where K is a positive integer, and where a timer period of one unit is a period of time necessary for receiving one data unit at the input of the first device;

sending the arranged K data units to the inputs of M devices, where M is a positive integer;

transferring a group of $H_j$ data units of the arranged K data units by a device j of the M devices from its inputs to its outputs within a time unit $T_x$ where the time period $T_x$ is less than or equal to one unit and, where $H_j$ is a positive integer and the sum of $H_j$ for $j=1, \ldots M$ is equal to K, where $H_j \leqq K$;

arranging the data units sent to the devices of the M devices transferring during the time period $T_x$ such that no two inputs of the devices of the M devices transferring during the time period $T_x$ receive the same data unit at any moment; and repeatedly combining and arranging the K data units from the outputs of the M devices by a second device such that the K data units appear at the output of the second device consecutively.

2. The method according to claim 1, wherein the data switching network is a slotted network.

3. The method according to claim 2, wherein each data unit is a sequence of data bits whose total transmission time is smaller than a unit of time.

4. The method according to claim 3, wherein the data unit does not contain any information of the path to the destination of the data unit.

5. The method according to claim 3, wherein the data unit contains dummy bits that do not carry information, and a period of time without signal transmission is considered as a sequence of dummy bits.

6. The method according to claim 1, wherein the data switching network is a packet switching network.

7. The method according to claim 6, wherein each data unit is a packet which contains header and payload, the header having information indicating the path to the destination of the packet.

8. The method according to claim 1, wherein the data switching network is an optical network.

9. The method according to claim 1, wherein the first device is an optical splitter or an optical switch, with K outputs connecting to the inputs of the M devices such that K data units are sent to the M devices for each K unit time period.

10. The method according to claim 1, further comprising adding an optical delay element before the first device such that the K data units are delayed before entering the first device.

11. The method according to claim 1, further comprising adding an optical delay element after the outputs of the first device and before the inputs of the M devices such that the K data units are delayed before entering the M devices.

12. The method according to claim 11, wherein the optical delay elements at the inputs of the devices of the M devices are transferring data units within the same predefined time unit $T_x$ have different delay values such that no two inputs of the devices receive the same data unit at any time.

13. The method according to claim 1, wherein the second device is an optical combiner or an optical switch with K inputs connecting to the outputs of the M devices such that the K data units are combined and sent via the output of the second device consecutively.

14. The method according to claim 13, further comprising adding optical delay elements at the outputs of the M devices such that the K data units are delayed before entering the inputs of the second device.

15. The method according to claim 14, wherein the delay elements at the outputs of the M devices have different delay values such that the K data units from the outputs of the M devices appear consecutively at the output of the second device.

16. The method according to claim 1, further comprising connecting a pilot message channel to a third device to describe the K data units sent to the inputs of the M devices such that the M devices are configured by the third device before the arrival of the K packets.

17. The method according to claim 10, wherein the optical delay elements are variable and fixed delay value optical fiber delay lines.

18. The method according to claim 1, wherein the device j is an optical switch with reconfiguration time not larger than K−1 time units.

19. The method according to claim 1, wherein K is greater than one.

20. A system for shortening the length of time gaps between data units in a data switching network; the system comprising:

a first device having an input receiving an arranged group of K data units consecutively in a time period of K units, where K is a positive integer, and where a time period of one unit is a period of time necessary for receiving one data unit;

M devices having inputs to receive the arranged K data units, where M is a positive integer;

a device j of the M devices to transfer a group of $H_j$ data units of the arranged K data units from its inputs to its outputs within a time unit $T_x$, where time period $T_x$ is less than or equal to one unit, where $H_j$ is a positive integer and the sum of $H_j$ for $j=1, \ldots M$ is equal to K, where $H_j \leqq K$;

wherein the data units sent to the devices of the M devices transferring during the time period $T_x$ are arranged such that no two inputs of the devices of the M devices transferring during the time unit $T_x$ receive the same data unit at any moment; and repeatedly combining and arranging the K data units from the outputs of the M devices by a second device such that the K data units appear at the output of the second device consecutively.

21. The method according to claim 1, wherein the K time units required for the first device to receive the K data units comprise a time period of length L, where L is a positive real number.

22. The method according to claim 1, wherein the K unit time period comprise a time period of length L, where L is a positive real number.

23. A method for shortening the length of time gaps between data units in a data switching network, the method comprising:

arranging a group of K data units received consecutively at an input of a first device in a time period of length L, where K is a positive integer and L is a positive real number;

sending the arranged K data units to the inputs of M devices, where M is a positive integer;

transferring a group of $H_j$ data units of the arranged K data units by a device j of the M devices from its inputs to its outputs within a time period $T_j$ of length $L_j$, where $H_j$ is a positive integer and the sum of $H_j$ for $j=1, \ldots M$ is equal to K, where $H_j \leqq K$, and $L_j$ is a positive real number, where $L_j \leqq L$ for $j=1, \ldots M$;

arranging the data units sent to the devices of the M devices transferring during the time period $T_j$ such that no two inputs of the devices of the M devices transferring during the time period $T_j$ receive the same data unit at any moment for $j=1, \ldots M$; and repeatedly combining and arranging the K data units from the outputs of the M devices by a second device such that the K data units appear at the output of the second device consecutively.

* * * * *

UNITED STATES PATENT AND TRADEMARK OFFICE
CERTIFICATE OF CORRECTION

PATENT NO. : 8,218,575 B2  
APPLICATION NO. : 12/277028  
DATED : July 10, 2012  
INVENTOR(S) : Li et al.

Page 1 of 1

It is certified that error appears in the above-identified patent and that said Letters Patent is hereby corrected as shown below:

In Fig. 1, Sheet 1 of 7, delete "FIG" and insert -- FIG. --, therefor at each occurrence throughout the drawings.

In Column 6, Line 11, delete "(Hayword," and insert -- (Hayward, --, therefor.

In Column 8, Line 61, in Claim 1, delete "timer" and insert -- time --, therefor.

In Column 9, Line 1, in Claim 1, delete "Tx" and insert -- Tx, --, therefor.

In Column 10, Line 22, in Claim 20, delete "where time" and insert -- where the time --, therefor.

In Column 10, Line 24, in Claim 20, delete "sun" and insert -- sum --, therefor.

Signed and Sealed this  
Second Day of April, 2013

Teresa Stanek Rea  
*Acting Director of the United States Patent and Trademark Office*